US012129700B2

(12) United States Patent
Holzapfel

(10) Patent No.: US 12,129,700 B2

(45) Date of Patent: Oct. 29, 2024

(54) FURNITURE DRIVE

(71) Applicant: Julius Blum GmbH, Hoechst (AT)

(72) Inventor: Andreas Holzapfel, Bregenz (AT)

(73) Assignee: JULIUS BLUM GMBH, Hoechst (AT)

( * ) Notice: Subject to any disclaimer, the term of this patent is extended or adjusted under 35 U.S.C. 154(b) by 434 days.

(21) Appl. No.: 17/520,062

(22) Filed: Nov. 5, 2021

(65) Prior Publication Data

US 2022/0056747 A1 Feb. 24, 2022

Related U.S. Application Data

(63) Continuation of application No. PCT/AT2020/060153, filed on Apr. 15, 2020.

(30) Foreign Application Priority Data

May 17, 2019 (AT) .............................. A 50452/2019

(51) Int. Cl.
*E05F 1/10* (2006.01)
*E05F 1/12* (2006.01)
(Continued)

(52) U.S. Cl.
CPC .......... *E05F 1/1058* (2013.01); *E05F 1/1261* (2013.01); *E05F 1/14* (2013.01);
(Continued)

(58) Field of Classification Search
CPC ......... E05F 1/1058; E05F 1/1261; E05F 1/14; E05F 3/22; E05Y 2600/41; E05Y 2600/452; E05Y 2900/20
(Continued)

(56) References Cited

U.S. PATENT DOCUMENTS 8,056,991 B2 11/2011 Hollenstein
8,959,709 B2 2/2015 Hasegawa et al.
(Continued)

FOREIGN PATENT DOCUMENTS

CN 101460692 6/2009
CN 106175199 A 12/2016
(Continued)

OTHER PUBLICATIONS

Search Report issued Aug. 15, 2022 in corresponding Chinese Patent Application No. 202080036585.6.
(Continued)

*Primary Examiner* — Janet M Wilkens
*Assistant Examiner* — Timothy M Ayres
(74) *Attorney, Agent, or Firm* — Wenderoth, Lind & Ponack, L.L.P.

(57) ABSTRACT

A furniture drive includes a carrier configured to be fixed to or within a furniture panel of a furniture carcass, an actuating arm assembly arranged on the carrier, a spring device for applying a force to the actuating arm assembly, an adjustment device for adjusting a force of the spring device to the actuating arm assembly, and a threaded section having a longitudinal direction. An engagement location of the spring device is adjustable along the threaded section by a rotation of an adjustment element about a rotational axis, and the rotational axis of the adjustment element and the longitudinal direction of the threaded section enclose an angle to one another. The angle formed by the rotational axis of the adjustment element and the longitudinal direction of the threaded section is configured to be varied upon a movement of the actuating arm.

20 Claims, 6 Drawing Sheets

(51) Int. Cl.
*E05F 1/14* (2006.01)
*E05F 3/22* (2006.01)

(52) U.S. Cl.
CPC ............ *E05F 3/22* (2013.01); *E05Y 2600/41* (2013.01); *E05Y 2600/452* (2013.01); *E05Y 2900/20* (2013.01)

(58) Field of Classification Search
USPC ........................................................ 312/319.2
See application file for complete search history.

(56) References Cited

U.S. PATENT DOCUMENTS

| | | | | |
|---|---|---|---|---|
| 9,506,283 | B2 * | 11/2016 | Folie ......................... | E02D 5/80 |
| 10,487,554 | B2 * | 11/2019 | Lubetz .................... | F16H 25/18 |
| 10,662,690 | B2 | 5/2020 | Schluge | |
| 11,060,337 | B2 | 7/2021 | Sobolewski et al. | |
| 11,072,962 | B2 | 7/2021 | Herrmann et al. | |
| 11,180,944 | B2 | 11/2021 | Herrmann et al. | |
| 11,274,689 | B2 * | 3/2022 | Cattaneo ............. | F16B 12/2054 |
| 11,503,911 | B2 * | 11/2022 | Cattaneo ............. | A47B 91/024 |
| 11,525,295 | B2 * | 12/2022 | Nordieker ................. | E05F 3/20 |
| 2006/0002759 | A1 | 1/2006 | Blackman et al. | |
| 2006/0016047 | A1 | 1/2006 | Blackman et al. | |
| 2009/0260292 | A1 | 10/2009 | Hausch | |
| 2011/0068669 | A1 | 3/2011 | Hollenstein | |
| 2013/0031746 | A1 | 2/2013 | Hasegawa et al. | |
| 2013/0333291 | A1 * | 12/2013 | Blum .................... | E05F 1/1058 49/386 |
| 2015/0361705 | A1 | 12/2015 | Folie | |
| 2018/0363348 | A1 | 12/2018 | Schluge | |
| 2019/0203517 | A1 | 7/2019 | Herrmann et al. | |
| 2019/0234129 | A1 | 8/2019 | Herrmann et al. | |
| 2020/0123827 | A1 | 4/2020 | Sobolewski et al. | |
| 2021/0010311 | A1 | 1/2021 | Nordieker et al. | |
| 2022/0056745 | A1 * | 2/2022 | Holzapfel ............... | E05D 15/40 |
| 2022/0065011 | A1 * | 3/2022 | Holzapfel ............... | E06B 3/443 |
| 2022/0074248 | A1 * | 3/2022 | Holzapfel ............. | E05D 5/0276 |
| 2023/0030015 | A1 * | 2/2023 | Boesch ................. | E05F 1/1261 |
| 2023/0265699 | A1 * | 8/2023 | Baldreich ........... | E05D 11/1021 49/381 |
| 2023/0272648 | A1 * | 8/2023 | Baldreich ................. | E05F 1/10 312/325 |
| 2023/0272649 | A1 * | 8/2023 | Baldreich ............... | E05D 15/40 312/325 |
| 2023/0272655 | A1 * | 8/2023 | Baldreich ............... | E05D 15/40 49/381 |

FOREIGN PATENT DOCUMENTS

| | | |
|---|---|---|
| CN | 107461100 | 12/2017 |
| CN | 106175199 B | 8/2018 |
| CN | 108884698 | 11/2018 |
| CN | 109415923 | 3/2019 |
| JP | 60-187296 | 12/1985 |
| JP | 9-4320 | 1/1997 |
| JP | 2011-528241 | 11/2011 |
| JP | 2016-509143 | 3/2016 |
| WO | 2010/006346 | 1/2010 |
| WO | 2011/129154 | 10/2011 |
| WO | 2014/134642 | 9/2014 |
| WO | 2018/192819 | 10/2018 |

OTHER PUBLICATIONS

International Search Report issued Jun. 29, 2020 in International (PCT) Application No. PCT/AT2020/060153.

* cited by examiner

FURNITURE DRIVE

BACKGROUND OF THE INVENTION

The present invention relates to a furniture drive for moving a furniture part movably-supported relative to a furniture carcass. The furniture drive includes a carrier configured to be fixed to or within a furniture panel of the furniture carcass, and an actuating arm assembly arranged on the carrier, in which the actuating arm assembly includes at least one movably-supported actuating arm for moving the movable furniture part. A spring device is provided for applying a force to the actuating arm assembly, and an adjustment device is provided for adjusting a force of the spring device to the actuating arm assembly. The adjustment device includes an adjustment element rotatable about a rotational axis, and a threaded section having a longitudinal direction. An engagement location of the spring device is adjustable along the threaded section by a rotation of the adjustment element about the rotational axis, and the rotational axis of the adjustment element and the longitudinal direction of the threaded section enclose an angle to one another.

Moreover, the invention concerns an item of furniture comprising a furniture carcass, a furniture part movably-supported relative to the furniture carcass, and a furniture drive of the type to be described for moving the movable furniture part.

The carrier of such furniture drives is usually fixed within or to a sidewall of the furniture carcass. The actuating arm assembly of the furniture drive is pre-stressed by at least one spring device and is connected to the movable furniture part in a mounted condition.

WO 2018/192819 A1 discloses a furniture drive having the features as recited in the preamble. On a front-end region of the housing of the furniture drive, a rotatable tool receiver is provided, and a spindle nut supported on a spindle is movable along the spindle by rotating the tool receiver with the aid of a tool. A spring assembly is supported on the spindle nut, and a force of the spring assembly acting on the actuating arm assembly can be varied by the adjustable support of the spindle nut along the spindle. The spindle is arranged so as to be stationary in relation to the housing of the furniture drive.

Further furniture drives with an adjustment device for adjusting a torque to a movably-supported actuating arm are known, for example, from WO 2014/134642 A1, CN 107461100 A and CN 106175199 B.

A drawback of the known furniture drives is the fact that the construction of the furniture drive, due to the position of the spring assembly to be adjusted, has to be dimensioned relatively large. Moreover, the adjustment path of the spring device along the threaded spindle is limited.

SUMMARY OF THE INVENTION

It is an object of the present invention to provide a furniture drive mentioned in the introductory part, thereby preventing at least one of the above-discussed drawbacks.

According to the invention, the angle that the rotational axis of the adjustment element and the longitudinal direction of the threaded section enclose to one another can be varied upon a movement of the at least one actuating arm.

In other words, the adjustment element and the rotatable threaded section are angularly-movably supported relative to one another upon a movement of the actuating arm. Therefore, the adjustment device for adjusting the force of the spring device and the actuating arm assembly can adopt different relative positions to one another. The components of the furniture drive can thereby be nested into one another and can thus be arranged more tightly to one another. In this way, the furniture drive can be constructed more compactly, and higher power ranges of the furniture drive can be provided.

A further advantage of the present invention is the fact that the arrangement of the adjustment element on the furniture drive is not fixedly predefined. Instead, the adjustment element, in the production of the furniture drive and depending on the type and application field, can be arranged on various desired positions.

For example, the adjustment element of the adjustment device, in a mounted condition of the furniture drive, faces towards the movable furniture part and is arranged on a front-end region of the carrier. In this way, the accessibility to the adjustment element can be significantly improved. This is also an advantage when the carrier of the furniture drive, in a mounted condition on the furniture panel, is configured to be at least partially, preferably substantially entirely, received within the furniture panel. With a furniture drive integrated within the furniture panel, an accessibility of the adjustment element from the side is only possible through bores of the furniture panel. These bores weaken the furniture panel, are often considered to be visually disturbing and include an additional installation expense. For this reason, an accessibility of the adjustment element from a front-end face of the carrier can really be an advantage.

The furniture drive can include at least one angularly-movable coupling device for transmitting a rotational movement of the adjustment element into a rotational movement of the threaded section. For realizing an angularly-movable coupling device, which provides a transmission of torque in a flexed shaft train, various possibilities are available for the person skilled in the art. The angularly-movable coupling device can include at least one elastic element, preferably a folding bellows, a rubber form element or a coil-spring coupling, and/or at least one gear, preferably a bevel gear transmission, and/or a joint, preferably a cross-joint or a cardan joint.

The furniture drive can include at least one shaft configured to be driven by the adjustment element, the at least one shaft being provided for driving the threaded section. The at least one shaft can be displaceably supported relative to the carrier in or along a guide, preferably an elongated hole. In this way, compensation movements of components of the furniture drive caused by the angularly-movable coupling device can be at least partially compensated for, in order to prevent tilting movements or jamming of the components of the furniture drive.

The adjustment element of the adjustment device can include a receiving device for a tool, preferably a screwdriver. The adjustment element can be driven by exerting a torque to the receiving device with the aid of the tool. For example, the receiving device can include a cross-head form (for example a Pozidriv-profile), a square profile, a hexagonal profile or a six-lobe drive (for example a Torx-profile).

The carrier of the furniture drive can be configured as a mounting plate or as a, in particular cuboidal, housing. The carrier can have a substantially rectangular form, and it can be preferably provided that the ratio of a length of the carrier relative to a height of the carrier is larger than 1 to 0.7, preferably larger than 1 to 0.5. By such a dimensioning of the carrier, a reduced constructional height of the furniture drive can be provided.

The item of furniture according to the invention comprises a furniture carcass, a furniture part movably-supported relative to the furniture carcass, and at least one furniture drive of the type in question. Thereby, it can be provided that the furniture carcass includes at least one, preferably horizontally extending or vertically extending, furniture panel for fixing the carrier, and the carrier of the furniture drive is at least partially, preferably substantially entirely, received within the furniture panel of the furniture carcass.

BRIEF DESCRIPTION OF THE DRAWINGS

Further details and advantages of the present invention result from the following description of figures.

DETAILED DESCRIPTION OF THE INVENTION

Figure 1A:
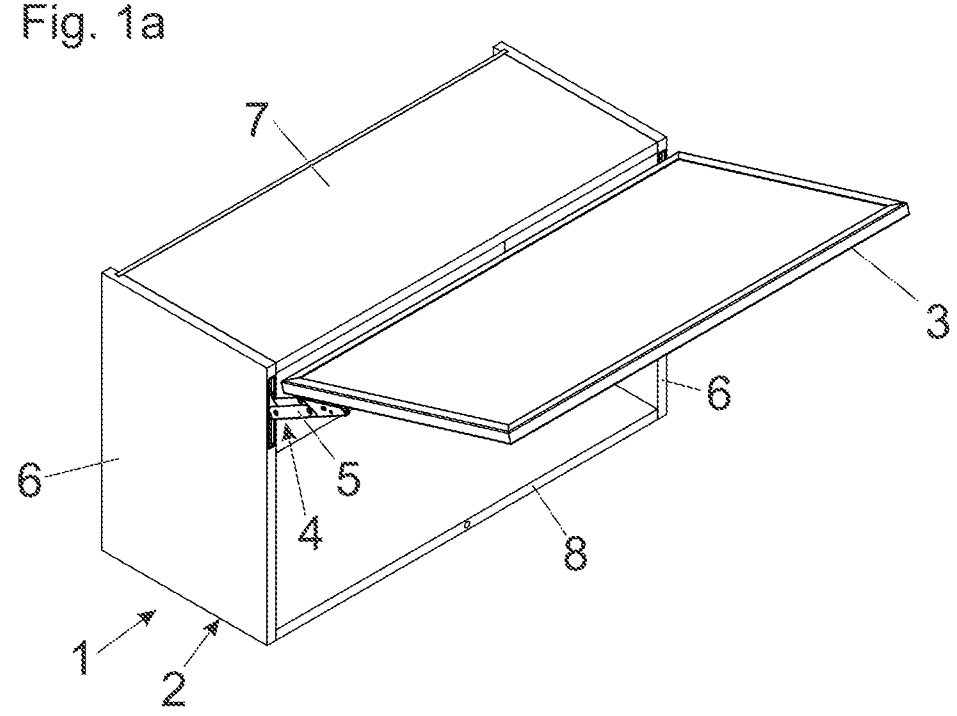
FIG. 1*a*, 1*b* show an item of furniture with a movable furniture part in a perspective view and in an exploded view.

FIG. 1*a* shows a perspective view of an item of furniture 1 comprising a furniture carcass 2, a furniture part 3 movably-supported relative to the furniture carcass 2, and at least one furniture drive 4 for moving the movable furniture part 3. The item of furniture 1 includes furniture panels 6 in the form of sidewalls, a top panel 7 and a bottom panel 8. In the shown embodiment, the furniture drive 4 is at least partially, preferably substantially entirely, integrated into the sidewall configured as a furniture panel 6. The movable furniture part 3 is movably supported between a closed position in which the furniture carcass 2 is covered, and an elevated open position in relation to the furniture carcass 2. Of course, it is also possible to integrate the furniture drive 4 into a horizontally extending furniture panel, such as, for example, into the top panel 7, into the bottom panel 8 and/or into a shelf arranged between the top panel 7 and the bottom panel 8. In such a case, the movable furniture part 3 is pivotally supported relative to the furniture carcass 2 about a vertically extending axis in a mounted position. The furniture drive 4 includes an actuating arm assembly 5 for moving the movable furniture part 3, and at least one spring device 10 (FIG. 1*b*) for applying a force to the actuating arm assembly 5.

Figure 1B:
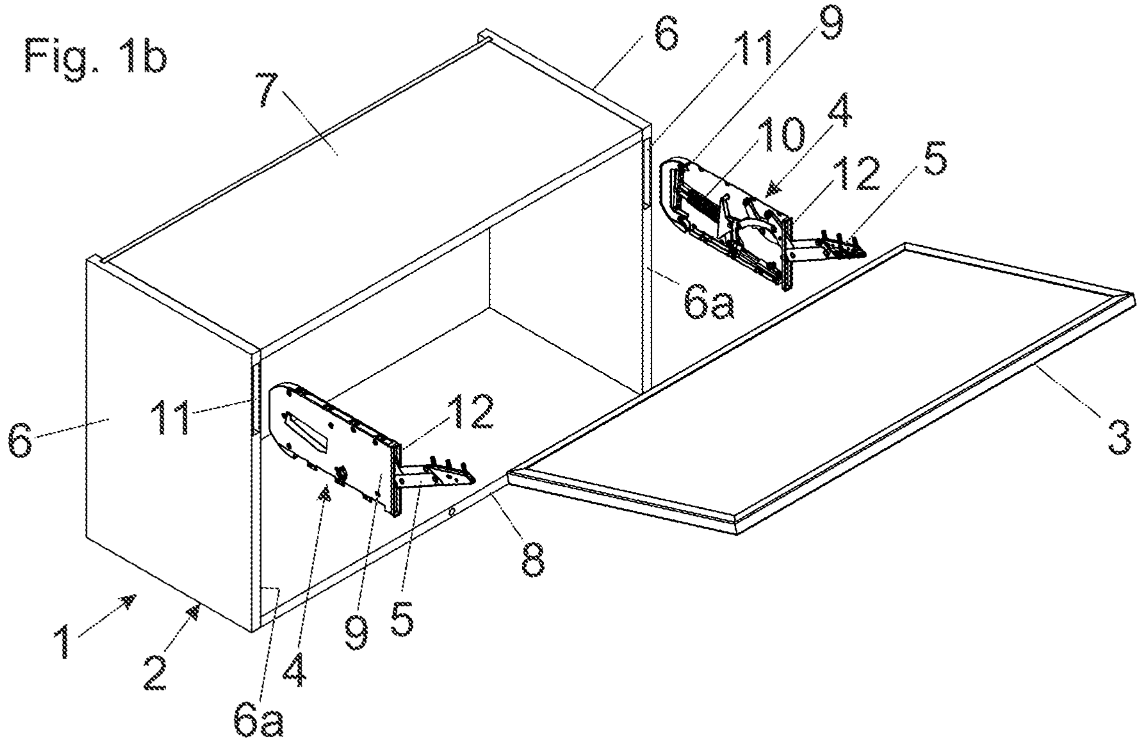

FIG. 1*b* shows the item of furniture 1 in an exploded view, in which two furniture drives 4, preferably identical in construction, are provided for moving the movable furniture part 3. Each of the furniture drives 4 includes a carrier 9 configured to be fixed to the furniture carcass 2. According to an embodiment, it can be provided that the carrier 9, in a mounted condition, is at least partially, preferably substantially entirely, received within a recess 11 of the sidewalls configured as furniture panels 6. In a mounted condition, the carrier 9 can be aligned substantially flush with the front face 6*a* of the furniture panel 6. The recess 11 can be configured, for example, as a blind hole, and the carrier 9 is insertable from the front (that is to say from the narrow front face 6*a* of the furniture panel 6) into the pocket-shaped recess 11 of the furniture panel 6 upon mounting. At least one spring device 10 for applying a force to the actuating arm assembly 5 is arranged in or on the carrier 9. On the front-end region of the carrier 9, a cover 12 is provided. At least one movably-supported actuating arm 5*a*, 5*b*, 5*c*, 5*d*, 5*e* (FIG. 2*a*) of the actuating arm assembly 5 can be guided through the cover 12 in a relative position.

Figure 2A:
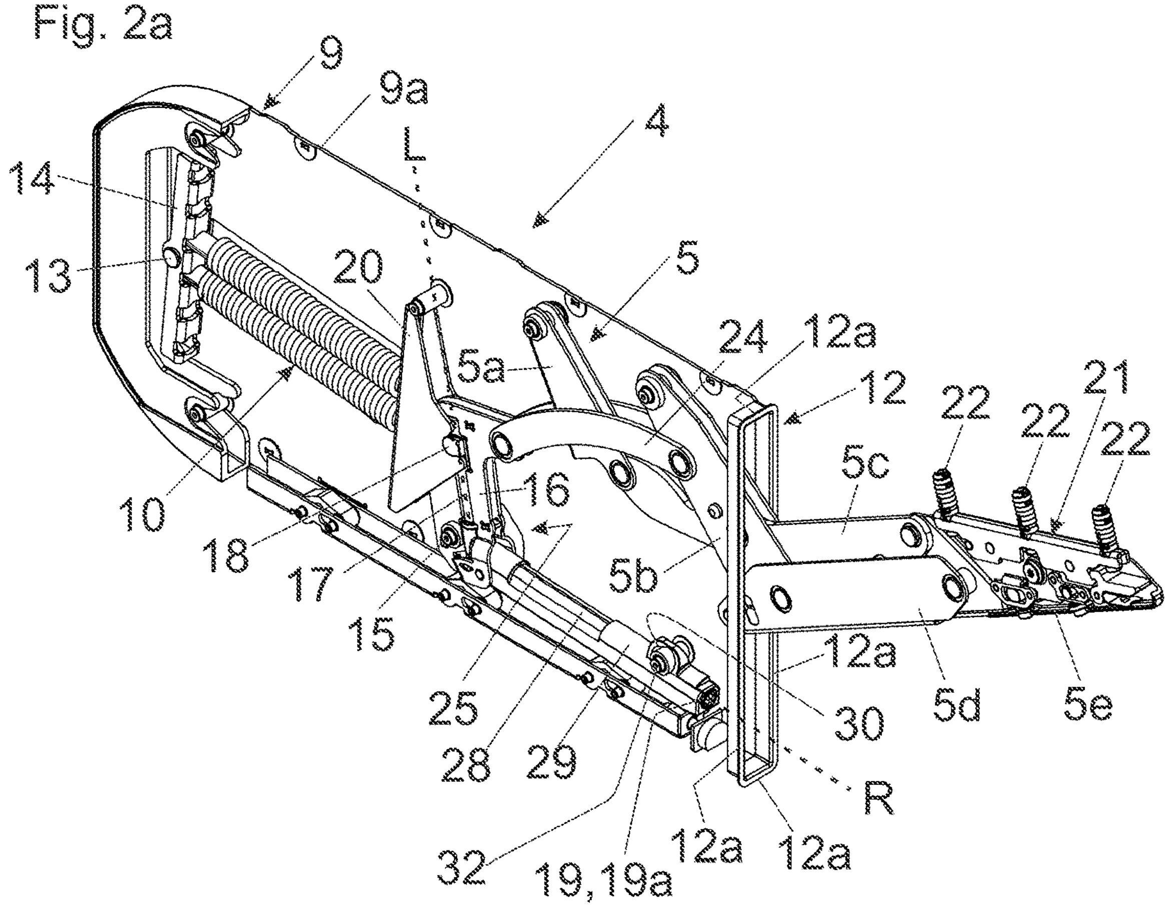
FIG. 2*a*, 2*b* show two different views of a furniture drive.

FIG. 2*a* shows the actuating drive 4 in a perspective view. The carrier 9 includes at least one flat-shaped housing wall 9*a*. A pivotable bearing portion 14 is provided on the housing wall 9*a*, the bearing portion 14 being pivotally supported about a hinge axis member 13 stationarily arranged on the carrier 9. The spring device 10 can thus be supported with a first end region on the stationary hinge axis member 13. The spring device 10 can include at least one helical spring, preferably at least one compression spring, or, alternatively, a gas pressure spring. A second end region of the spring device 10 acts on a pressure portion 20 which is hingedly connected with an intermediate lever 16 via an adjustable engagement location 18. The intermediate lever 16 is pivotable about a, preferably stationary, hinge axis 15. By an adjustment device 19, the force of the spring device 10 acting on the actuating arm assembly 5 can be adjusted. The adjustment device 19 includes an adjustment element 19*a* rotatable about a rotational axis (R), and a position of the engagement location 18 is adjustable along a threaded section 17 by rotating the adjustment element 19*a* about the rotational axis (R). The threaded section 17 has a longitudinal direction (L). The angle, that the longitudinal direction (L) of the threaded section 17 and the rotational axis (R) of the adjustment element 19*a* enclose relative to one another (i.e., the angle between the longitudinal direction (L) and the rotational axis (R)) can be varied upon a movement of the actuating arm assembly 5. By an angularly-movable coupling device 25, a rotational movement of the adjustment element 19*a* can be transmitted to the threaded section 17. As a result, the threaded section 17 can be set into a rotational movement and, therefore, the engagement location 18 is movable along the threaded section 17. It can be preferably provided that the adjustment element 19*a* of the adjustment device 19, in a mounted condition of the furniture drive 4, faces towards the movable furniture part 3 and is arranged in a front region of the carrier 9. In this way, the adjustment element 19*a* can be comfortably actuated from the front with the aid of a tool.

In the shown embodiment, at least one shaft 28 for driving the threaded section 17 is provided, the at least one shaft 28 being configured to be driven by the adjustment element 19*a* and being configured to be displaceably supported relative to the carrier 9 in or along a guide 30, preferably along an elongated hole. In this way, compensation movements of components of the furniture drive 4, caused by the angularly-movable coupling device 25, can be at least partially compensated for. The shaft 28 is arranged in or on a shaft bearing 29, the guide 30 being arranged on the shaft bearing 29 and a pin 32 stationarily arranged on the carrier 9 engages into the, preferably linearly configured, guide 30. Upon a compensation movement, the shaft bearing 29 is displaceable relative to the stationary pin 32.

The actuating arm assembly 5 includes at least one, preferably a plurality, of actuating arm(s) 5*a*, 5*b*, 5*c*, 5*d*, 5*e* for moving the movable furniture part 3. A fitting portion 21 is to be fixed to the movable furniture part 3, the fitting portion 21 having at least one or a plurality of fastening locations 22 and being configured to be releasably locked with an actuating arm 5*e* of the actuating arm assembly 5. In FIG. 2*a*, the locked condition between the actuating arm 5*e* and the fitting portion 21 is shown.

A cover 12 is provided on a front-end of the housing wall 9*a*, the cover 12 having at least one laterally protruding flange 12*a*. In the shown embodiment, the flange 12*a* is configured substantially ring-shaped and forms a depth-stop for the carrier 9, the depth-stop being configured to bear against a front face 6*a* of the furniture panel 6.

Figure 2B:
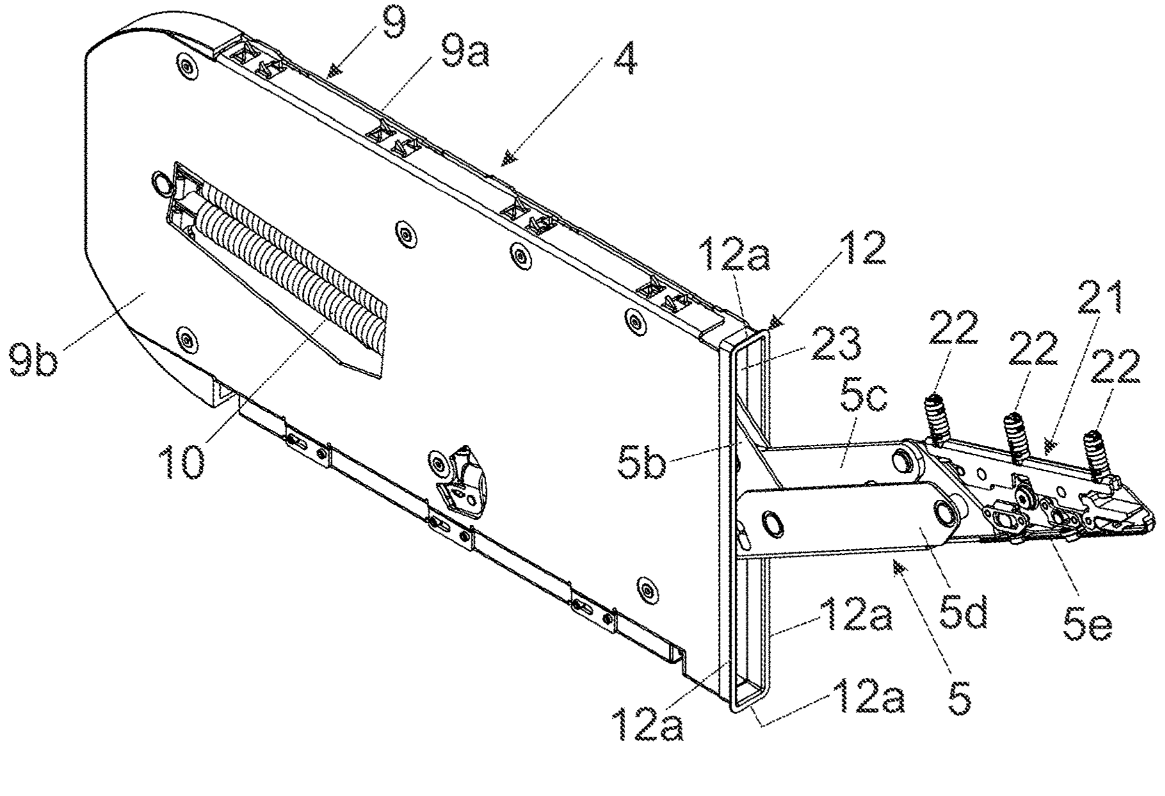

FIG. 2*b* shows the furniture drive 4 according to FIG. 2*a*, in which the carrier 9 is closed by a second housing wall 9*b*. Each of the first housing wall 9*a* and the second housing wall 9*b* is configured to be flat and jointly form a substantially cuboidal carrier 9. The housing walls 9*a*, 9*b* are mutually spaced from one another in a parallel relationship, and a front-sided opening 23 is formed between the housing walls 9*a*, 9*b*. The cover 12 is arranged in a region of the opening 23 and permits the passage of a tool in order for the adjustment device 19 to be actuated.

Figure 3A:
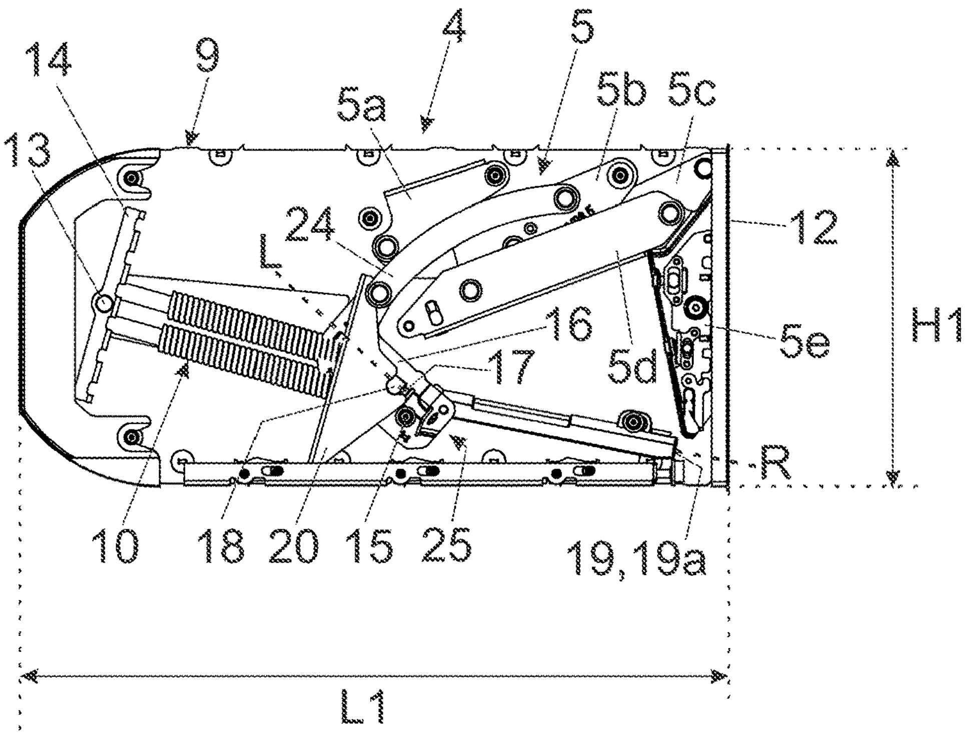
FIG. 3*a*, 3*b* show the furniture drive in a closed position and in an open position, with the force of the spring device set to a minimum.

FIG. 3*a* shows the furniture drive 4 with the carrier 9 in a side view. The threaded section 17 is arranged on an intermediate lever 16, the intermediate lever 16 being pivotally supported about a hinge axis 16, and the axis 16 is stationarily arranged on the carrier 9. In the shown figure, the spring device 10 applies a minimal torque to the actuating arm assembly 5, because the engagement location 18 of the spring device 10 is located in a region adjacent to the hinge axis 15 of the intermediate lever 16. A notional connecting line between the hinge axis 15 of the intermediate lever 16 and the engagement location 18 of the spring device 16 forms a relatively short lever arm, whereby a minimal torque acts on the actuating arm assembly 5. The rotational axis (R) of the adjustment element 19*a* of the adjustment device 19 and the longitudinal direction (L) of the threaded section 17 enclose an angle to one another, and the angle is variable upon a movement of the actuating arm assembly 5. The advantage of the present invention can well be seen with the aid of FIG. 3*a*, because in the shown closed position of the furniture drive 4—due to an angularly-movable support of the rotational axis (R) and the longitudinal direction (L)—the actuating arms 5*a*-5*e* of the actuating arm assembly 5, together with the spring device 10 and the adjustment device 19, can achieve a very compact position to one another.

The carrier 9 can be configured so as to be substantially rectangular shaped, and it can be preferably provided that the ratio of a length (L1) of the carrier 9 to a height (H1) of the carrier 9 is larger than 1 to 0.7, preferably larger than 1 to 0.5. By such a dimensioning, a reduced height (H1) of the carrier 9 can be provided. In this way, the height of the recess 11 (FIG. 1*b*) of the furniture panel 6 can be smaller dimensioned, and the manufacturing process of the recess 11 and a weakening of the furniture panel 6 are minor.

Figure 3B:
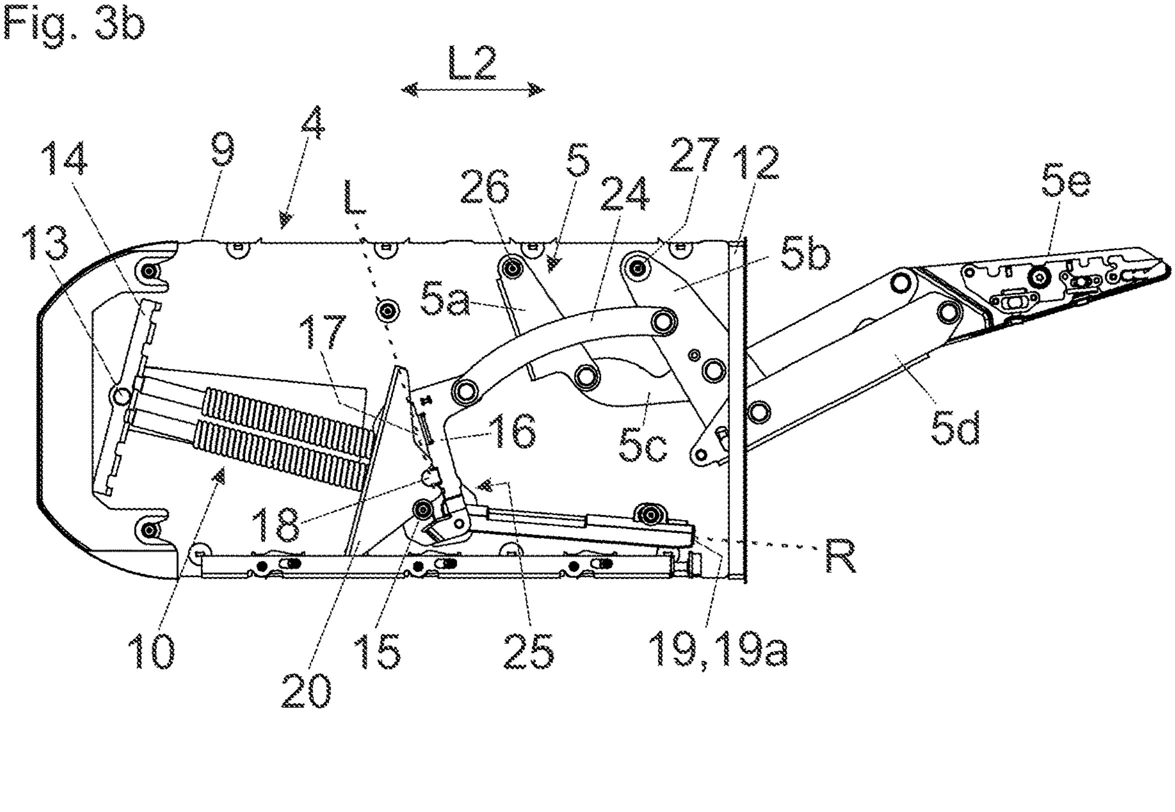

FIG. 3*b* shows the furniture drive 4 according to FIG. 3*a* with a minimal adjustment of the spring device 10, and the actuating arm assembly 5 with the actuating arms 5*a*-5*e* is located in an open position. It can be seen that the angle, that the rotational axis (R) of the adjustment element 19*a* and the longitudinal direction (L) of the threaded section 17 enclose to one another, has been decreased in relation to the closed position shown in FIG. 3*a*.

The actuating arm assembly 5 includes a first actuating arm 5*a* pivotable about a first pivoting axis 26, and at least one second actuating arm 5*b* pivotable about a second pivoting axis 27. The first pivoting axis 26 and the second pivoting axis 27 are mutually spaced from one another in a longitudinal direction (L2) of the carrier 9. The second pivoting axis 27, in relation to the first pivoting axis 26, is arranged on a front region of the carrier 9. The intermediate lever 16 is directly connected to the second (front) actuating arm 5*b* via a, preferably curved-shaped, pushing lever 24. The first actuating arm 5*a* is thus not directly connected to the pushing lever 24 by a hinge axis. Instead, the first actuating arm 5*a* is displaceably guided within the pushing lever 24. This can be clearly seen in FIG. 2*a*. As a result, an improved and a direct introduction of force of the spring device 10 to the actuating arm assembly 5 can be provided.

Figure 4A:
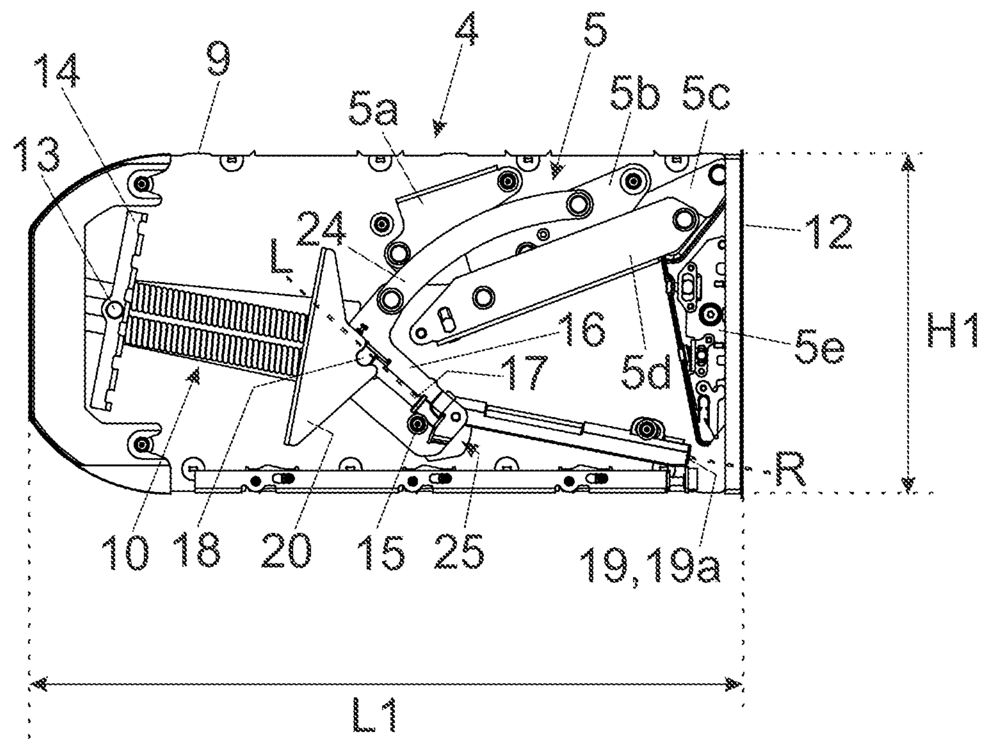
FIG. 4*a*, 4*b* show the furniture drive in a closed position and in an open position, with the force of the spring device set to a maximum.

FIG. 4*a* shows the furniture drive 4 according to the embodiment of FIG. 3*a* and FIG. 3*b*. The spring device 10 now applies a maximum torque to the actuating arm assembly 5, because the engagement location 18 of the spring device 10 has been moved in a position remote from the hinge axis 15 of the intermediate lever 16 by a rotation of the adjustment element 19*a* about the rotational axis (R). A notional connecting line between the hinge axis 15 of the intermediate lever 16 and the engagement location 18 of the spring device 10 now forms a longer lever arm in comparison to FIGS. 3*a*, 3*b*, whereby a maximum torque of the spring device 10 is applied to the actuating arm assembly 5.

Figure 4B:
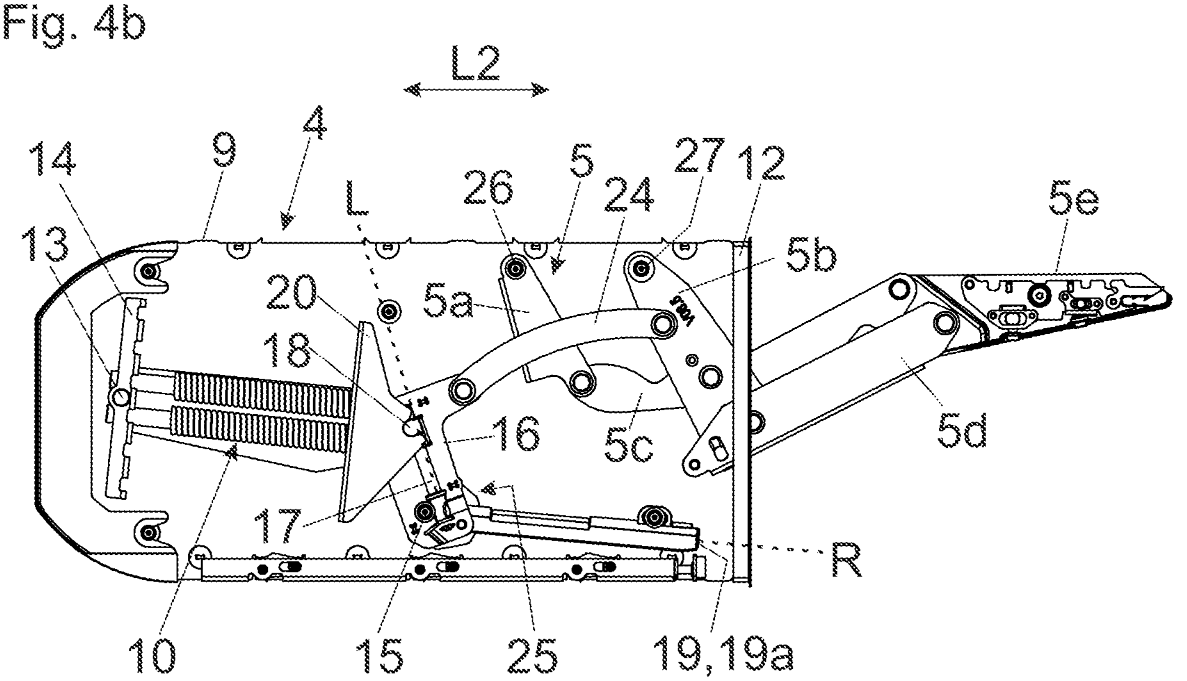

FIG. 4*b* shows the furniture drive 4 according to FIG. 4*a* in an open position of the actuating arm assembly 5, and a maximum torque of the spring device 10 is applied to the actuating arm assembly 5. The rotational axis (R) of the adjustment element 19*a* and the longitudinal direction (L) of the threaded section 17 enclose an angle to one another, and the angle can be varied by the presence of the angularly-movable coupling device 25 and by a movement of the actuating arm assembly 5.

Figure 5:
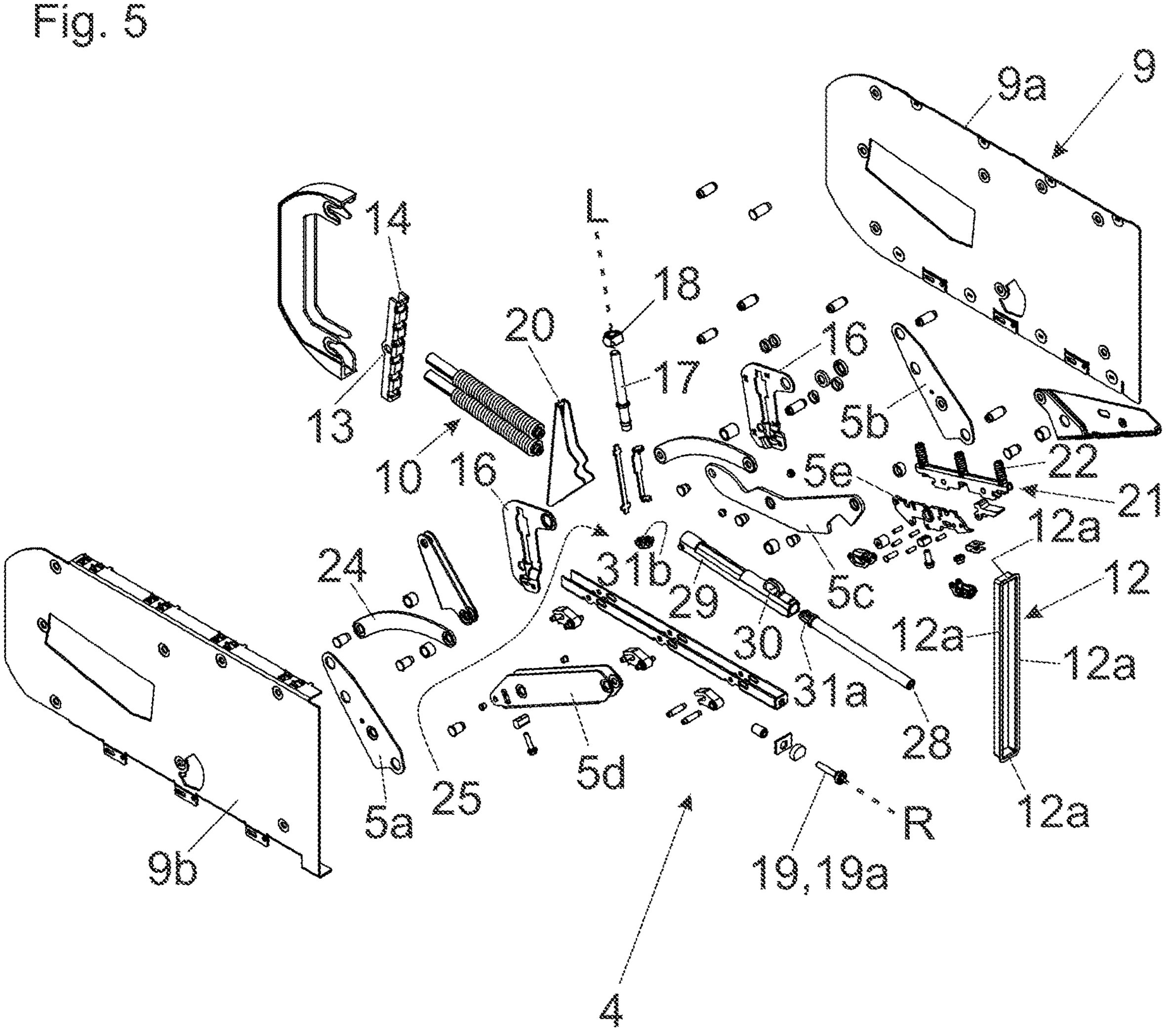
FIG. 5 shows the furniture drive in an exploded view.

FIG. 5 shows the furniture drive 4 in an exploded view. In the shown embodiment, the carrier 9 includes two housing walls 9*a*, 9*b* mutually spaced from one another in a parallel relationship, and the spring device 10 and the actuating arm assembly 5 with the actuating arms 5*a*-5*e* are received therebetween. The adjustment device 19 for adjusting a torque acting on the actuating arm assembly 5 includes an adjustment element 19*a*, the adjustment element 19*a* being rotatable about the rotational axis (R) and being configured to drive the threaded portion 17 via the shaft 28 so as to adjustably support the engagement location 18.

The angularly-movable coupling device 25 can include, for example, a first tooth arrangement 31*a* arranged on the shaft 28, the first tooth arrangement 31*a* being in angular engagement with a second tooth arrangement 31*b* arranged on the threaded section 17. The tooth arrangements 31*a*, 31*b* can jointly form a bevel gear transmission, and the angle enclosed between the rotational axis (R) of the adjustment element 19*a* and the longitudinal direction (L) of the threaded section 17 can be varied upon a movement of the actuating arm assembly 5. The shaft 28 is rotationally supported in or on a shaft bearing 29, and the shaft bearing 29 is displaceable relative to the carrier 9 by the guide 30 in order for compensation movements to be compensated.

Figure 6A:
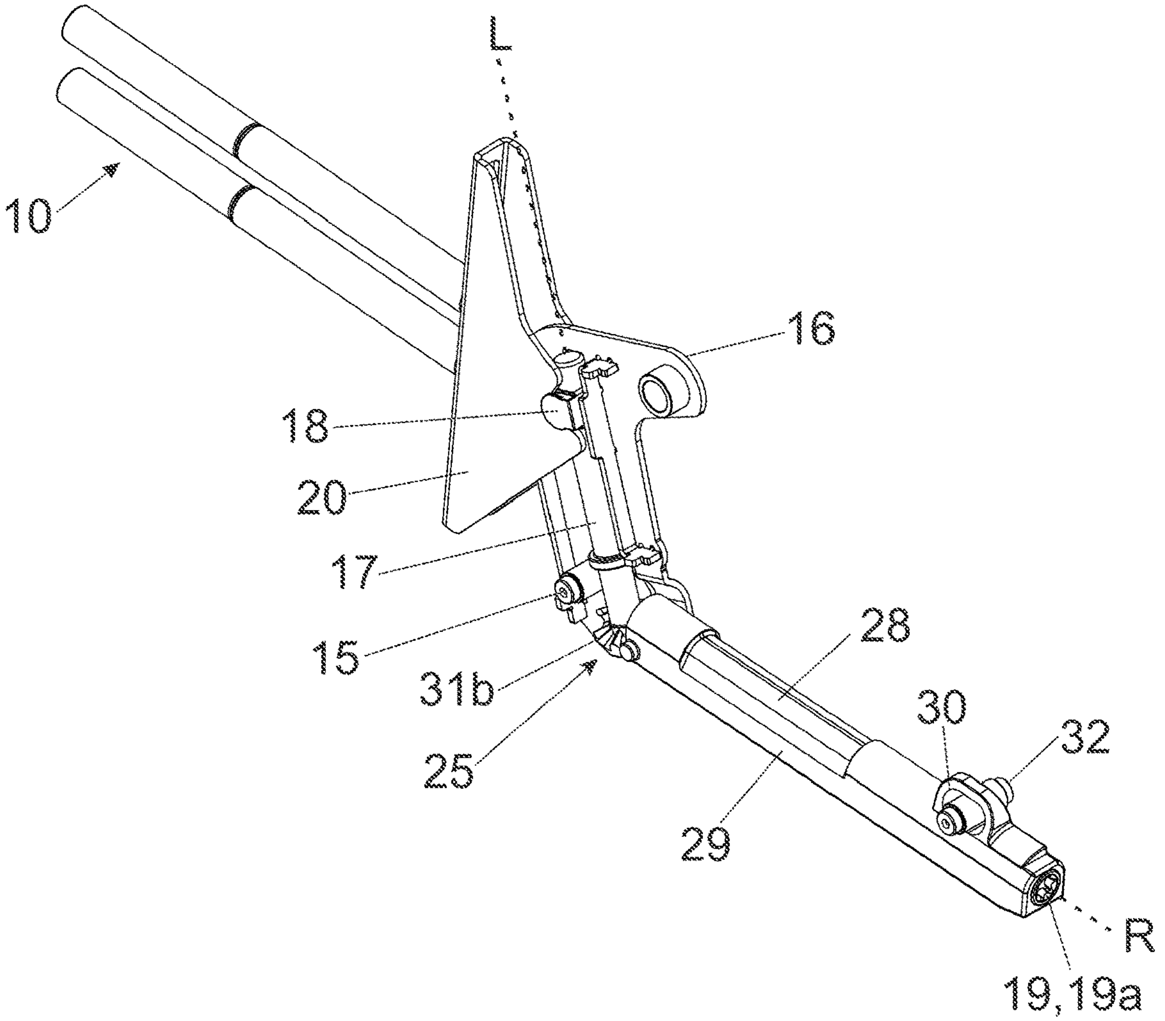
FIG. 6*a*, 6*b* show an angularly-movable coupling device in a detail view, and a cross-sectional view of the furniture drive countersunk within a furniture part.

FIG. 6*a* shows a detail view of an angularly-movable coupling device 25. By a rotation of the adjustment element 19*a* about the rotational axis (R), the shaft 28 can be driven. The shaft 28 drives the threaded section 17 about the longitudinal direction (L) via the tooth arrangement 31*b*, and the engagement location 18 of the spring device 10 can be moved along the threaded section 17. The threaded section 17 is arranged on the intermediate lever 16, the intermediate lever 16 being pivotally supported on the carrier 9 about the hinge axis 15. By virtue of the guide 30 of the shaft bearing 28, compensation movements, caused by the angularly-movable coupling device 25, can be compensated for.

Figure 6B:
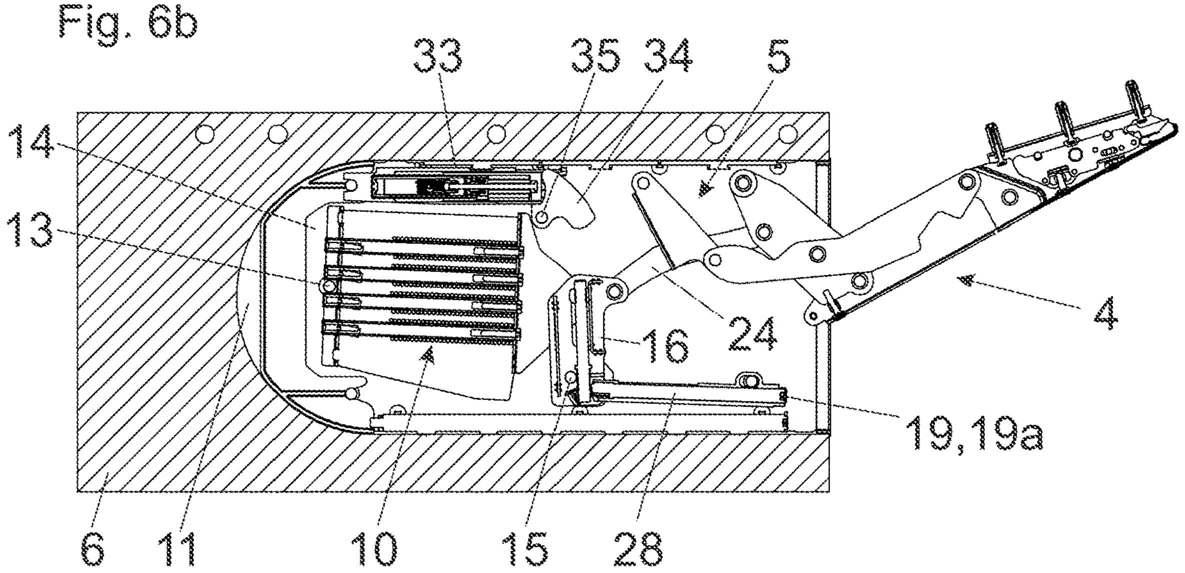

FIG. 6*b* shows the furniture drive 4 in a cross-sectional view, the furniture drive 4 being substantially entirely received within the recess 11 of the furniture panel 6. The furniture drive 4 can include at least one damping device 33, for example a piston-cylinder-unit, for dampening a movement of the actuating arm assembly 5. By a tilting lever 34 configured to be pivotable about the hinge axis 35, a movement of the actuating arm assembly 5 can be introduced into the damping device 33 upon a closing movement. In the shown embodiment, the pushing lever 24 abuts against the tilting lever 34 upon a closing movement of the actuating arm assembly 5, and a closing movement of the actuating arm assembly 5 (and therewith a closing movement of the movable furniture part 3) can be decelerated by a relative movement of the piston-cylinder-unit.

The invention claimed is:

1. A furniture drive for moving a furniture part movably-supported relative to a furniture carcass, the furniture drive comprising:

a carrier configured to be fixed to or within a furniture panel of the furniture carcass, an actuating arm assembly arranged on the carrier, the actuating arm assembly including a movably-supported actuating arm configured to move the movable furniture part, a spring device configured to apply a force to the actuating arm assembly, an adjustment device configured to adjust a force applied by the spring device to the actuating arm assembly, the adjustment device including:

an adjustment element rotatable about a rotational axis, and a threaded section having a longitudinal direction, wherein an engagement location of the spring device is adjustable along the threaded section by a rotation of the adjustment element about the rotational axis, wherein the rotational axis of the adjustment element and the longitudinal direction of the threaded section enclose an angle therebetween, and an angularly-movable coupling device for transmitting a rotational movement of the adjustment element into a rotational movement of the threaded section, wherein the angle enclosed between the rotational axis of the adjustment element and the longitudinal direction of the threaded section is variable upon a movement of the movably-supported actuating arm.

2. The furniture drive according to claim 1, further comprising a shaft configured to be driven by the adjustment element for driving the threaded section.

3. The furniture drive according to claim 2, wherein the shaft is displaceably supported relative to the carrier in or along a guide formed as an elongated hole.

4. The furniture drive according to claim 1, wherein the adjustment element of the adjustment device is to face towards the movable furniture part and is arranged on a front region of the carrier in a mounted condition of the furniture drive.

5. The furniture drive according to claim 1, wherein the spring device has a first end region supported on a hinge axis member stationarily arranged on the carrier, and has a second end region supported on the engagement location.

6. The furniture drive according to claim 1, wherein the spring device includes a helical spring.

7. The furniture drive according to claim 6, wherein the helical spring is a compression spring.

8. The furniture drive according to claim 1, wherein the carrier of the furniture drive is configured to be at least partially received within the furniture panel in a mounted condition on the furniture panel.

9. The furniture drive according to claim 8, wherein the carrier of the furniture drive is configured to be entirely received within the furniture panel in the mounted condition on the furniture panel.

10. The furniture drive according to claim 1, wherein the carrier is substantially rectangular-shaped.

11. The furniture drive according to claim 10, wherein the ratio of a length of the carrier to a height of the carrier is larger than 1 to 0.7.

12. The furniture drive according to claim 11, wherein the ratio of a length of the carrier to a height of the carrier is larger than 1 to 0.5.

13. The furniture drive according to claim 1, further comprising an intermediate lever pivotally supported on the carrier, the threaded section being arranged on the intermediate lever.

14. The furniture drive according to claim 13, wherein the actuating arm assembly includes a first actuating arm pivotable about a first hinge axis and a second actuating arm pivotable about a second hinge axis, wherein the first hinge axis and the second hinge axis are spaced apart from one another in a longitudinal direction of the carrier, the second hinge axis being arranged in a front region of the carrier relative to the first hinge axis, and the intermediate lever being directly connected to the second actuating arm via a pushing lever.

15. The furniture drive according to claim 1, wherein the adjustment element of the adjustment device includes a receiving device for receiving a tool.

16. The furniture drive according to claim 1, wherein the furniture drive includes a damping device configured to dampen a movement of the actuating arm assembly.

17. The furniture drive according to claim 16, wherein the damping device is a piston-cylinder-unit.

18. An item of furniture comprising:

a furniture carcass, a furniture part movably-supported relative to the furniture carcass, and the furniture drive according to claim 1 for moving the movable furniture part.

19. The item of furniture according to claim 18, wherein the furniture carcass includes a furniture panel to which the carrier is fixed, wherein the carrier of the furniture drive is at least partially received within a recess of the furniture panel.

20. The item of furniture according to claim 19, wherein the carrier of the furniture drive is entirely received within the recess of the furniture panel.

* * * * *